(12) United States Patent
Furusawa et al.

(10) Patent No.: US 8,176,719 B2
(45) Date of Patent: May 15, 2012

(54) REINFORCING CORD AND RUBBER PRODUCT USING THE SAME

(75) Inventors: Masamori Furusawa, Tokyo (JP); Hideki Imanishi, Tokyo (JP); Hiroshi Iizuka, Yamagata (JP)

(73) Assignee: Nippon Sheet Glass Company, Limited, Osaka (JP)

( * ) Notice: Subject to any disclaimer, the term of this patent is extended or adjusted under 35 U.S.C. 154(b) by 0 days.

(21) Appl. No.: 12/741,711

(22) PCT Filed: Nov. 13, 2008

(86) PCT No.: PCT/JP2008/070711
§ 371 (c)(1),
(2), (4) Date: May 6, 2010

(87) PCT Pub. No.: WO2009/063952
PCT Pub. Date: May 22, 2009

(65) Prior Publication Data
US 2010/0267863 A1      Oct. 21, 2010

(30) Foreign Application Priority Data

Nov. 15, 2007 (JP) .................................. 2007-296623

(51) Int. Cl.
*D02G 3/02* (2006.01)
(52) U.S. Cl. ........................................... 57/225; 57/229
(58) Field of Classification Search ............ 57/210, 57/225, 229, 236, 237, 240; 428/375, 377, 428/392; 474/260, 261, 263, 264
See application file for complete search history.

(56) References Cited

U.S. PATENT DOCUMENTS

| | | | |
|---|---|---|---|
| 7,032,371 B2 * | 4/2006 | Smith et al. .................. 57/237 |
| 7,080,500 B2 | 7/2006 | Akiyama et al. | |
| 7,404,426 B2 | 7/2008 | Akiyama et al. | |
| 2003/0175490 A1 | 9/2003 | Furukawa et al. | |
| 2004/0226641 A1 * | 11/2004 | Akiyama et al. .............. 152/451 |
| 2007/0098983 A1 | 5/2007 | Akiyama et al. | |
| 2007/0144134 A1 | 6/2007 | Kajihara | |
| 2009/0229237 A1 | 9/2009 | Imanishi et al. | |

FOREIGN PATENT DOCUMENTS

JP       2004-011076 A       1/2004
(Continued)

*Primary Examiner* — Shaun R Hurley
(74) *Attorney, Agent, or Firm* — Hamre, Schumann, Mueller & Larson, P.C.

(57) ABSTRACT

A reinforcing cord of the present invention is a reinforcing cord (10) for rubber reinforcement including a fiber core (11) and a plurality of strands (12) disposed around the fiber core (11). The fiber core (11) is formed of one or a plurality of highly elastic fibers having a tensile elastic modulus of at least 100 GPa. Each of the plurality of strands (12) is formed of a plurality of glass fibers that are primarily twisted, and the plurality of strands (12) are finally twisted to be disposed around the fiber core (11). The direction of the final twist of the plurality of strands is opposite to the direction of the primary twist in each of the plurality of strands (12). The number of final twists of the plurality of strands (12) is 1.0 to 3.0 times/25 mm, and a ratio of the number of primary twists in each of the plurality of strands (12) to the number of final twists of the plurality of strands (12) (the number of primary twists/the number of final twists) is in a range of 1.5 to 2.5.

10 Claims, 2 Drawing Sheets

FOREIGN PATENT DOCUMENTS

| | | |
|---|---|---|
| JP | 3846236 B2 | 9/2006 |
| JP | 3864820 B2 | 10/2006 |
| WO | WO 2004/090224 A1 | 10/2004 |
| WO | WO 2005/061766 A1 | 7/2005 |
| WO | WO 2007/063686 A1 | 6/2007 |

* cited by examiner

REINFORCING CORD AND RUBBER PRODUCT USING THE SAME

TECHNICAL FIELD

The present invention relates to a reinforcing cord particularly for reinforcing rubber products, and to a rubber product using the cord.

BACKGROUND ART

Reinforcing cords that are formed using reinforcing fibers such as glass fibers have been proposed as reinforcing materials for reinforcing rubber products such as rubber belts. The rubber products such as rubber belts, however, are subjected to bending stress repeatedly and thereby the performance thereof tends to deteriorate due to bending fatigue. Accordingly, reinforcing cords to be used for such rubber products are required to have high bending fatigue resistance. Furthermore, a timing belt that is used to drive a camshaft of an internal combustion engine of an automobile is required to have high dimensional stability to maintain the suitable timing. Therefore, reinforcing cords to be used for such rubber products are required to have high tensile strength and tensile elasticity.

In order to obtain a reinforcing cord having both high bending fatigue resistance and good tensile properties (i.e., high tensile strength and high tensile elasticity), cords for rubber reinforcement each having a two-layer structure of a core member (inner layer) and a side member (outer layer) have been proposed.

For example, WO 2007/063686 (Document 1) discloses a reinforcing cord using glass fibers as a core member and a side member. In this cord, the relationship between the number of primary twists in the core member and that in the side member and the relationship between the direction of primary twist in the side member and that of final twist therein (Lang's lay type side member) are limited to achieve high bending fatigue resistance and good tensile properties.

Japanese Patent No. 3864820 (Document 2) discloses a hybrid cord in which a highly elastic fiber strand composed of fibers such as polyparaphenylene benzobisoxazole (PBO) fibers having a high elastic modulus is used as a core member and a glass fiber strand having a lower elastic modulus than the highly elastic fiber strand is used as a side member. Japanese Patent No. 3846236 (Document 3) discloses a hybrid cord in which a glass fiber strand is used as a core member and an aramid fiber strand is used as a side member. WO 2004/090224 (Document 4) discloses a hybrid cord in which a carbon fiber strand is used as a core member and a glass fiber strand is used as a side member. In each of these hybrid cords, the number of primary twists and the number of final twists in the core member and the side member each can be adjusted suitably within a predetermined range of values.

JP 2004-011076 A (Document 5) discloses a reinforcing cord in which PBO fibers, glass fibers, or carbon fibers are used for a core member and glass fibers or PBO fibers are used for a side member. In this reinforcing cord, the direction of primary twist and the direction of final twist in the side member are the same, and the direction of primary twist in the core member and the direction of primary twist in the side member are opposite to each other. This configuration provides the reinforcing cord with high bending fatigue resistance and good tensile properties.

None of the reinforcing cords disclosed in the above documents 1 to 5, however, has both sufficiently high bending fatigue resistance and sufficiently good tensile properties, and therefore further improvement are needed. None of the above documents 1 to 5 discloses specific details, such as the relationship between the number of primary twists and the number of final twists, and the directions of these twists, to achieve both higher bending fatigue resistance and better tensile properties, although they define preferable ranges of values for the number of primary twists, the number of final twists, and the like in the core member and the side member. Accordingly, the reinforcing cord disclosed in each of the above documents 1 to 5 has a problem in that if the number of twists is increased simply, the bending fatigue resistance improves but the tensile elasticity and the tensile strength decrease, and if the number of twists is decreased simply, the tensile elasticity and the tensile strength improve but the bending fatigue resistance decreases.

DISCLOSURE OF THE INVENTION

The present invention has been made in view of this conventional problem, and it is an object of the present invention to provide a reinforcing cord having both high bending fatigue resistance and good tensile properties (high tensile elasticity and high tensile strength). Another object of the present invention is to provide a rubber product using such a reinforcing cord.

A reinforcing cord of the present invention is a reinforcing cord for rubber reinforcement including: a fiber core; and a plurality of strands disposed around the fiber core. The fiber core is formed of one or a plurality of highly elastic fibers having a tensile elastic modulus of at least 100 GPa. Each of the plurality of strands is formed of a plurality of glass fibers that are primarily twisted. The plurality of strands are finally twisted to be disposed around the fiber core. The direction of the final twist of the plurality of strands is opposite to the direction of the primary twist in each of the plurality of strands. The number of final twists of the plurality of strands is 1.0 to 3.0 times/25 mm, and a ratio of the number of primary twists in each of the plurality of strands to the number of final twists of the plurality of strands (the number of primary twists/the number of final twists) is in a range of 1.5 to 2.5.

In the reinforcing cord of the present invention, a "normal lay" technique, in which the direction of primary twist and the direction of final twist are opposite to each other, is employed to form the strands (hereinafter also referred to as "peripheral strands") used as the side members to be disposed around the fiber core. In the reinforcing cord of the present invention formed by using this twisting technique, the ratio of the number of primary twists to the number of final twists for the peripheral strands is in the range of 1.5 to 2.5. Accordingly, the bending fatigue resistance can be improved without decreasing the tensile elasticity and the tensile strength.

A rubber product of the present invention is a rubber product including: a rubber composition; and the above-mentioned reinforcing cord of the present invention embedded in the rubber composition. Examples of the rubber products of the present invention include a toothed belt and a flat belt.

Even if high levels of bending fatigue resistance and tensile properties are required, the rubber product of the present invention can satisfy such high requirements.

BEST MODE FOR CARRYING OUT THE INVENTION

Figure 1:
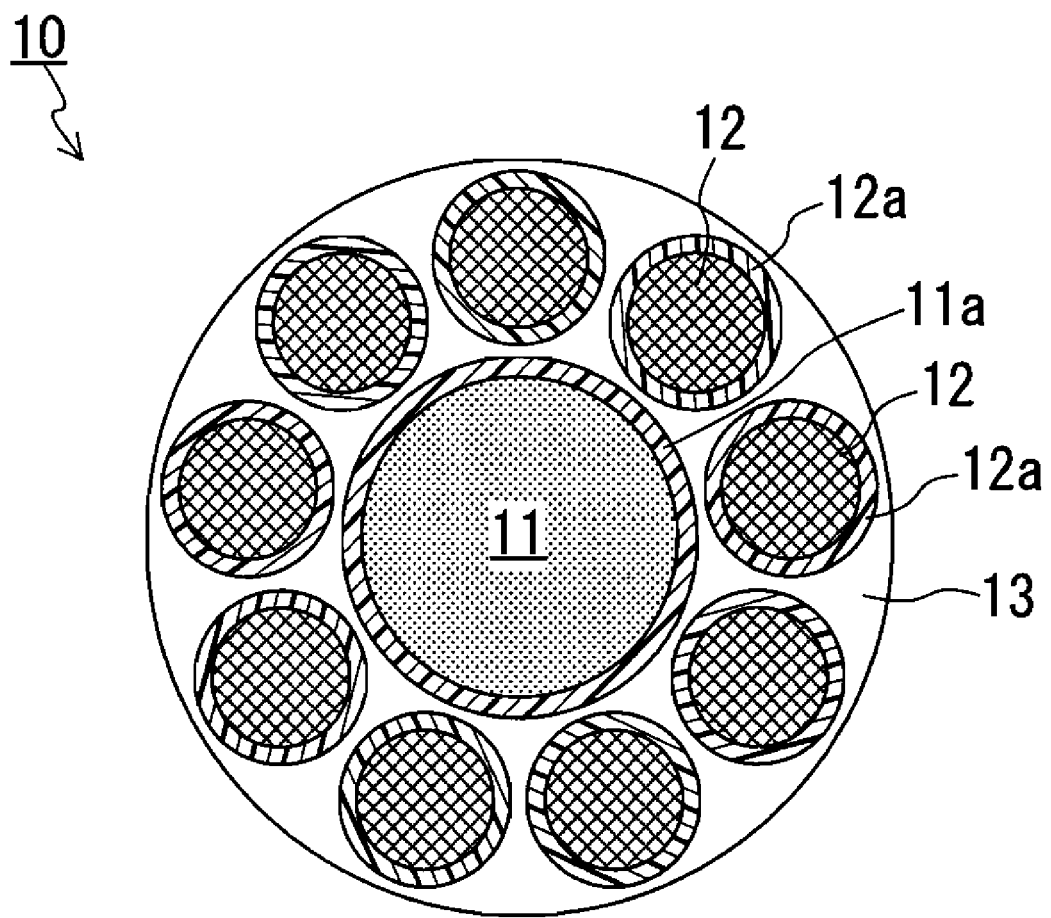
FIG. 1 is a cross-sectional view showing schematically an example of a reinforcing cord of the present invention.

Hereinafter, an embodiment of the present invention will be described in detail.

(Reinforcing Cord)

The reinforcing cord of the present invention includes a fiber core and a plurality of strands (peripheral strands) disposed around the fiber core. The fiber core is formed of one or a plurality of highly elastic fibers having a tensile elastic modulus of at least 100 GPa. Each of the peripheral strands is formed of a plurality of glass fibers that are primarily twisted, and the plurality of peripheral strands are finally twisted to be disposed around the fiber core.

In the reinforcing cord of the present invention, the direction of final twist and the direction of primary twist for the plurality of peripheral strands are opposite to each other. That is, the peripheral strands are twisted to be "normal lay" strands. Furthermore, the number of final twists of the plurality of peripheral strands is 1.0 to 3.0 times/25 mm, and a twist ratio (the number of primary twists/the number of final twists) for the plurality of peripheral strands is in a range of 1.5 to 2.5. The use of normal lay peripheral strands allows the resulting reinforcing cord to have good tensile properties. Furthermore, the twist ratio of 1.5 to 2.5 for the peripheral strands suppresses the shear stress in the resulting reinforcing cord so as to impart good bending fatigue resistance to the cord while maintaining good tensile properties thereof. Moreover, the number of final twists of 1.0 to 3.0 times/25 mm of the peripheral strands allows the resulting reinforcing cord to maintain its bending fatigue resistance and tensile properties (particularly tensile elasticity) sufficiently. That is, with the above-mentioned twist ratio, number of twists, and twist direction, a reinforcing cord having both high bending fatigue resistance and good tensile properties can be obtained.

The highly elastic fiber used as the fiber core needs to have a tensile elastic modulus of at least 100 GPa, and preferably 150 to 300 GPa. For example, carbon fibers and PBO fibers can be used as the highly elastic fibers in the reinforcing cord of the present invention. The fiber core may be formed of one high elastic fiber, or may be formed of a plurality of (for example, 2 to 12) highly elastic fibers. The fiber core may be formed of highly elastic fibers that are primarily twisted. The fiber core may be formed of highly elastic fibers that are not primarily twisted (i.e., untwisted highly elastic fibers). In the case where the fiber core is formed of highly elastic fibers that are primarily twisted, it is preferable that the number of primary twists in the fiber core be, for example, 0.1 to 3.0 times/25 mm, to maintain the high elastic property.

For the peripheral strands, glass fibers that have been primarily twisted in the direction opposite to the direction of final twist to be performed after the primary twist are used. Glass fibers to be used in the present invention are not particularly limited. For example, E-glass fibers and high-strength glass fibers can be used. The number of peripheral strands to be disposed around the fiber core is not particularly limited. For example, the number of peripheral strands is 5 to 24, and preferably 8 to 15.

For example, it is preferable that the reinforcing cord include a fiber core formed of one highly elastic fiber and 8 to 15 peripheral strands disposed around the fiber core. This is because when this range of numbers of peripheral strands are disposed, the resulting reinforcing cord has higher tensile elasticity.

The reinforcing cord of the present invention further may include coating films provided on the surface of the fiber core and the surfaces of the peripheral strands. These coating films are effective in bonding the fiber core and the peripheral strands or the peripheral strands to one another, or in protecting the fiber core and the peripheral strands. As the coating films, those commonly used for a reinforcing cord can be used. These coating films can be formed, for example, by applying a treatment liquid containing a rubber latex as its main component to the fiber core and the peripheral strands and then drying the treatment liquid. More specifically, the coating films can be formed by applying a treatment liquid containing, for example, a rubber latex agent such as H-NBR (hydrogenated nitrile rubber latex), bismaleimide, carbon black, and a resorcinol-formaldehyde condensation product to the fiber core and the peripheral strands and then drying the treatment liquid. As stated herein, the treatment liquid containing a rubber latex as its main component means a treatment liquid containing rubber latex in the highest amount of all the components. For example, it is a treatment liquid containing rubber latex of at least 30 wt. %, preferably at least 50 wt. %, and further preferably at least 60 wt. %.

The reinforcing cord further may include a rubber layer that covers the surface of the cord. This rubber layer, for example, effectively improves the adhesion between the reinforcing cord and a rubber matrix (rubber composition) in which the cord is embedded. A treatment liquid containing, for example, chlorosulfonated polyethylene, isocyanate, carbon black, P-nitrosobenzene, xylene, toluene, etc., can be used suitably to form the rubber layer. The rubber layer can be formed by applying such a treatment liquid to the surface of the reinforcing cord and then drying the treatment liquid.

FIG. 1 shows an example of the reinforcing cord according to the present invention. This reinforcing cord 10 includes a fiber core 11 and a plurality of peripheral strands 12 disposed around the fiber core 11. Furthermore, the surface of the cord 10 is covered with a rubber layer 13 (hatching thereof is omitted for clarity of the drawing). A coating film 11a is provided on the surface of the fiber core 11, while coating films 12a are provided on the surfaces of the respective peripheral strands 12. Details of the materials and the like for the fiber core 11, peripheral strands 12, coating films 11a and 12a, and rubber layer 13 are those described above.

The cord for rubber reinforcement of the present invention can be manufactured by common methods. The peripheral strand can be formed by commonly-used known methods. Commonly-used known methods also can be employed to perform twisting, and to apply and dry an adhesive or a binding agent.

(Rubber Product)

The reinforcing cord of the present invention is applicable to a wide range of rubber products. For example, the reinforcing cord of the present invention is applicable particularly suitably to toothed belts, flat belts, and the like. The cord for rubber reinforcement of the present invention is embedded in a rubber composition (rubber matrix) of a rubber product so as to reinforce the rubber product.

Figure 2:
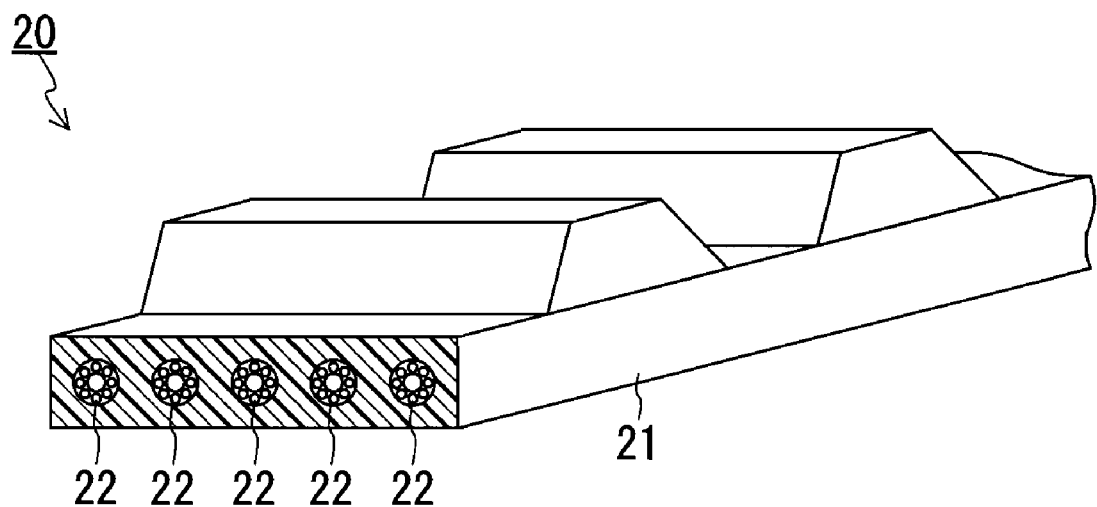
FIG. 2 is an exploded perspective view showing an example of a rubber product according to the present invention.

FIG. 2 shows a toothed belt that is an example of the rubber product of the present invention. This toothed belt 20 includes a body 21 and a plurality of reinforcing cords 22 embedded in the body 21. The body 21 is formed of a rubber composition. Each of the reinforcing cords 22 is the reinforcing cord of the present invention. The reinforcing cords 22 are arranged in parallel with the direction in which the toothed belt 20 moves. Known members can be used for the parts other than the reinforcing cords 22.

EXAMPLES

Hereafter, the present invention is described in more detail with reference to examples.

Examples 1 to 5 and Comparative Examples 1 to 7

In Examples 1 to 5 and Comparative Examples 1 to 7, carbon fibers having a tensile elastic modulus of 230 GPa were used as highly elastic fibers for fiber cores, and high-strength glass fibers having a fiber diameter of 7 μM were used for peripheral strands (skin). Table 1 below shows the specific configurations of the reinforcing cords of Examples 1 to 5 and Comparative Examples 1 to 7.

First, a primary treatment liquid shown in Table 5 was applied to the carbon fibers and the glass fibers and then the treatment liquid was dried for one minute in a drying furnace set at 150° C. Thus, carbon fibers and glass fibers each having a coating layer formed thereon were produced. The carbon fibers and the glass fibers thus produced were used to produce reinforcing cords that satisfy the conditions such as the number of twists as shown in Table 1. The number of final twists was 1.7 times/25 mm in all the reinforcing cords thus produced.

Next, a rubber layer was formed on the surface of each of the reinforcing cords. Specifically, a secondary treatment liquid shown in Table 6 was applied to the reinforcing cord and then the treatment liquid was dried for two minutes in a drying furnace set at 150° C. Thus, the rubber layer was produced.

Examples 6 to 10 and Comparative Examples 8 to 14

In Examples 6 to 10 and Comparative Examples 8 to 14, reinforcing cords that satisfy the conditions such as the number of twists as shown in Table 2 were produced. These reinforcing cords were produced in the same manner as the reinforcing cords produced in Examples 1 to 5 and Comparative Examples 1 to 7, except that the number of final twists was 2.0.

Example 11 and Comparative Examples 15 and 16

In Example 11 and Comparative Examples 15 and 16, reinforcing cords that satisfy the conditions such as the number of twists as shown in Table 3 were produced. These reinforcing cords were produced in the same manner as the reinforcing cords produced in Examples 1 to 5 and Comparative Examples 1 to 7, except that the fiber core was formed of a primarily-twisted fiber.

Example 12 and Comparative Examples 17 and 18

In Example 12 and Comparative Examples 17 and 18, reinforcing cords that satisfy the conditions such as the number of twists as shown in Table 4 were produced. These reinforcing cords were produced in the same manner as the reinforcing cords produced in Examples 1 to 5 and Comparative Examples 1 to 7, except that a PBO fiber having a tensile elastic modulus of 270 GPa was used for the fiber core.

The bending properties and tensile properties of the reinforcing cords of Examples 1 to 12 and Comparative Examples 1 to 18 thus obtained were evaluated.

Figure 3:
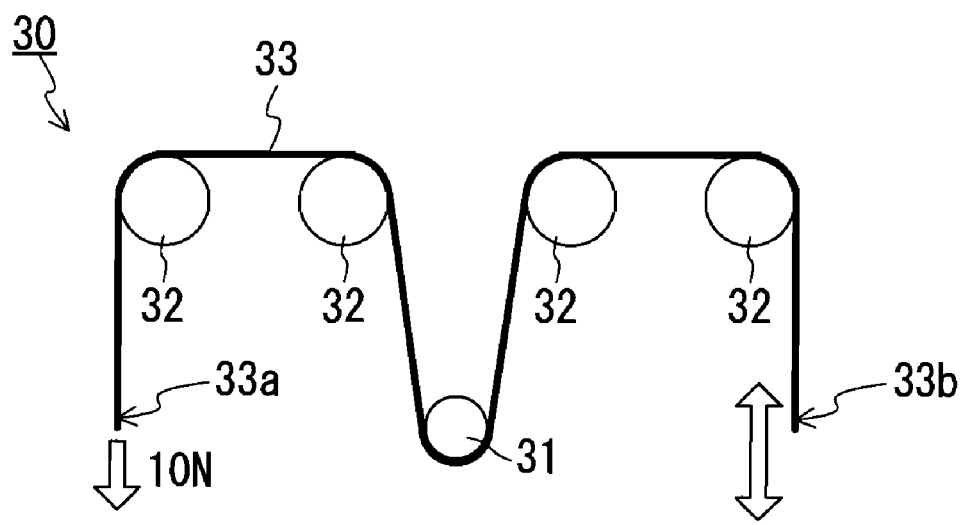
FIG. 3 is a diagram showing schematically a method of a bending test.

First, a flat belt (test piece) to be used for the evaluation of bending properties was produced. A reinforcing cord was embedded in a rubber matrix having the composition shown in Table 7, so as to obtain a flat belt 295 mm in length, 9 mm in width, and 3 mm in thickness. Then, the bending properties of the flat belt thus produced was evaluated. Specifically, the flat belt was set in a bending tester shown in FIG. 3, and the number of bends that it took for the belt surface to crack was determined. This value was regarded as a bend life. The bending tester 30 includes a flat pulley 31, a motor (not shown in FIG. 3), and four guide pulleys 32. First, the produced reinforcing cord 33 was hung on the five pulleys. A weight was attached to one end 33a of the reinforcing cord 33 to apply an initial tensile force of 10 N to the reinforcing cord 33. In that state, the other end 33b of the reinforcing cord 33 was reciprocated in the directions indicated with the double-headed arrow in FIG. 3, and thereby the reinforcing cord 33 was bent repeatedly. The bending test was performed under the following conditions: pulley radius: 5 mm; tension: 10 N; and frequency: 10 Hz.

The tensile test was carried out for the evaluation of the tensile properties by using an air chuck for stretching the cord under the conditions of an elastic stress rate of 50 m/min and a gauge length of 500 mm/min. The tensile properties were evaluated based on the tensile strength that is the strength at break and the tensile load at 0.8% elongation.

TABLE 1

| | | Example 1 | Example 2 | Example 3 | Example 4 | Example 5 | Com. Example 1 | Com. Example 2 | Com. Example 3 | Com. Example 4 | Com. Example 5 | Com. Example 6 | Com. Example 7 |
|---|---|---|---|---|---|---|---|---|---|---|---|---|---|
| Fiber core | Material | Carbon fiber | Carbon fiber | Carbon fiber | Carbon fiber | Carbon fiber | Carbon fiber | Carbon fiber | Carbon fiber | Carbon fiber | Carbon fiber | Carbon fiber | Carbon fiber |
| | Number of fiber cores | 1 | 1 | 1 | 1 | 1 | 1 | 1 | 1 | 1 | 1 | 1 | 1 |
| | Number of primary twists | 0 | 0 | 0 | 0 | 0 | 0 | 0 | 0 | 0 | 0 | 0 | 0 |
| | Direction of primary twist | — | — | — | — | — | — | — | — | — | — | — | — |
| Peripheral strand | Material | Glass fiber | Glass fiber | Glass fiber | Glass fiber | Glass fiber | Glass fiber | Glass fiber | Glass fiber | Glass fiber | Glass fiber | Glass fiber | Glass fiber |
| | Number of peripheral strands | 12 | 12 | 12 | 12 | 12 | 12 | 12 | 12 | 12 | 12 | 12 | 12 |
| | Number of primary twists | 3.2 | 3.9 | 3.6 | 3.0 | 2.6 | 5.1 | 1.7 | 0.9 | 0.9 | 1.7 | 2.6 | 3.6 |
| | Direction of primary twist | S | S | S | S | S | S | S | S | Z | Z | Z | Z |
| | Twist ratio (Number of primary twists/ | 1.9 | 2.3 | 2.1 | 1.8 | 1.5 | 3.0 | 1.0 | 0.5 | 0.5 | 1.0 | 1.5 | 2.1 |

TABLE 1-continued

|  |  | Example 1 | Example 2 | Example 3 | Example 4 | Example 5 | Com. Example 1 | Com. Example 2 | Com. Example 3 | Com. Example 4 | Com. Example 5 | Com. Example 6 | Com. Example 7 |
|---|---|---|---|---|---|---|---|---|---|---|---|---|---|
|  | Number of final twists) |  |  |  |  |  |  |  |  |  |  |  |  |
| Final twists | Number of final twists | 1.7 | 1.7 | 1.7 | 1.7 | 1.7 | 1.7 | 1.7 | 1.7 | 1.7 | 1.7 | 1.7 | 1.7 |
|  | Direction of final twist | Z | Z | Z | Z | Z | Z | Z | Z | Z | Z | Z | Z |
| Bending properties | Cord life (×10$^6$ times) | 9.5 | 9.0 | 8.9 | 9.2 | 8.2 | 7.0 | 5.0 | 6.8 | 7.5 | 7.7 | 7.3 | 7.6 |
| Tensile properties | Strength | 1213 | 1209 | 1233 | 1189 | 1251 | 1132 | 1171 | 1143 | 1164 | 1182 | 1123 | 1076 |
|  | Tensile load at 0.8% elongation (N) | 363 | 377 | 368 | 381 | 356 | 367 | 375 | 387 | 349 | 378 | 337 | 318 |

TABLE 2

|  |  | Example 6 | Example 7 | Example 8 | Example 9 | Example 10 | Com. Example 8 | Com. Example 9 | Com. Example 10 | Com. Example 11 | Com. Example 12 | Com. Example 13 | Com. Example 14 |
|---|---|---|---|---|---|---|---|---|---|---|---|---|---|
| Fiber core | Material | Carbon fiber | Carbon fiber | Carbon fiber | Carbon fiber | Carbon fiber | Carbon fiber | Carbon fiber | Carbon fiber | Carbon fiber | Carbon fiber | Carbon fiber | Carbon fiber |
|  | Number of fiber cores | 1 | 1 | 1 | 1 | 1 | 1 | 1 | 1 | 1 | 1 | 1 | 1 |
|  | Number of primary twists | 0 | 0 | 0 | 0 | 0 | 0 | 0 | 0 | 0 | 0 | 0 | 0 |
|  | Direction of primary twist | — | — | — | — | — | — | — | — | — | — | — | — |
| Peripheral strand | Material | Glass fiber | Glass fiber | Glass fiber | Glass fiber | Glass fiber | Glass fiber | Glass fiber | Glass fiber | Glass fiber | Glass fiber | Glass fiber | Glass fiber |
|  | Number of peripheral strands | 12 | 12 | 12 | 12 | 12 | 12 | 12 | 12 | 12 | 12 | 12 | 12 |
|  | Number of primary twists | 3.8 | 4.6 | 4.2 | 3.6 | 3.0 | 6 | 2.0 | 1.0 | 1.0 | 2.4 | 3.0 | 4.2 |
|  | Direction of primary twist | S | S | S | S | S | S | S | S | Z | Z | Z | Z |
|  | Twist ratio (Number of primary twists/Number of final twists) | 1.9 | 2.3 | 2.1 | 1.8 | 1.5 | 3.0 | 1.0 | 0.5 | 0.5 | 1.2 | 1.5 | 2.1 |
| Final twist | Number of final twists | 2.0 | 2.0 | 2.0 | 2.0 | 2.0 | 2.0 | 2.0 | 2.0 | 2.0 | 2.0 | 2.0 | 2.0 |
|  | Direction of final twist | Z | Z | Z | Z | Z | Z | Z | Z | Z | Z | Z | Z |
| Bending properties | Cord life (×10$^6$ times) | 9.7 | 9.1 | 8.8 | 9.4 | 8.8 | 7.5 | 5.4 | 6.0 | 7.9 | 8.1 | 8.4 | 7.4 |
| Tensile properties | Strength | 1106 | 1070 | 1163 | 1148 | 1258 | 1161 | 1134 | 1126 | 1093 | 1117 | 1061 | 1007 |
|  | Tensile load at 0.8% elongation (N) | 358 | 366 | 347 | 369 | 372 | 368 | 381 | 344 | 348 | 341 | 311 | 296 |

TABLE 3

|  |  | Example 11 | Com. Example 15 | Com. Example 16 |
|---|---|---|---|---|
| Fiber core | Material | Carbon fiber | Carbon fiber | Carbon fiber |
|  | Number of fiber cores | 1 | 1 | 1 |
|  | Number of primary twists | 0.7 | 0.7 | 0.7 |
|  | Direction of primary twist | S | S | Z |
| Peripheral strand | Material | Glass fiber | Glass fiber | Glass fiber |
|  | Number of peripheral strands | 12 | 12 | 12 |
|  | Number of primary twists | 2.5 | 1.7 | 2.5 |

TABLE 3-continued

|  |  | Example 11 | Com. Example 15 | Com. Example 16 |
|---|---|---|---|---|
|  | Direction of primary twist | S | S | Z |
|  | Twist ratio | 1.5 | 1.0 | 1.5 |
| Final twist | Number of final twists | 1.7 | 1.7 | 1.7 |
|  | Direction of final twist | Z | Z | Z |
| Bending properties | Cord life (×10⁶ times) | 7.5 | 6.3 | 6.7 |
| Tensile properties | Strength | 1234 | 1153 | 1133 |
|  | Tensile load at 0.8% elongation (N) | 402 | 430 | 389 |

TABLE 4

|  |  | Example 12 | Com. Example 17 | Com. Example 18 |
|---|---|---|---|---|
| Fiber core | Material | PBO fiber | PBO fiber | PBO fiber |
|  | Number of fiber cores | 1 | 1 | 1 |
|  | Number of primary twists | 0 | 0 | 0 |
|  | Direction of primary twist | — | — | — |
| Peripheral strand | Material | Glass fiber | Glass fiber | Glass fiber |
|  | Number of peripheral strands | 12 | 12 | 12 |
|  | Number of primary twists | 3.2 | 1.7 | 2.5 |
|  | Direction of primary twist | S | S | Z |
|  | Twist ratio | 1.9 | 1.0 | 1.5 |
| Final twist | Number of final twists | 1.7 | 1.7 | 1.7 |
|  | Direction of final twist | Z | Z | Z |
| Bending properties | Cord life (×10⁶ times) | 8.1 | 5.4 | 7.3 |
| Tensile properties | Strength | 1343 | 1339 | 1288 |
|  | Tensile load at 0.8% elongation (N) | 419 | 437 | 410 |

TABLE 5

| Component | Content (parts by mass) |
|---|---|
| H-NBR (*1) | 100 |
| Bismaleimide | 25 |
| Carbon black | 40 |

(*1) hydrogenated nitrile rubber latex (ZETPOL LATEX, manufactured by JAPAN ZEON CORPORATION)

TABLE 6

| Component | Content (parts by mass) |
|---|---|
| Chemlok 223X (*2) | 100 |
| Bismaleimide | 25 |
| Carbon black | 40 |

(*2) manufactured by Load Corporation

TABLE 7

| Component | Content (parts by mass) |
|---|---|
| H-NBR (*3) | 70 |
| H-NBR/ZDMA (*4) | 30 |
| ZnO | 10 |
| Stearic acid | 1 |
| Carbon black | 30 |
| Trioctyl Trimellitate | 5 |
| Sulfur | 0.1 |
| 1,3-Bis-(t-butylperoxy-isopropyl)-benzene | 6 |

(*3) hydrogenated nitrile rubber (ZETPOL 2020, manufactured by JAPAN ZEON CORPORATION)
(*4) hydrogenated nitrile rubber with zinc dimethacrylate dispersed therein (ZSC 2000L, manufactured by JAPAN ZEON CORPORATION)

It was found from the results shown above that the reinforcing cords of Examples 1 to 12 that satisfy the twist ratio of 1.5 to 2.5 have higher bending fatigue resistance than the reinforcing cords of Comparative Examples (Comparative Examples of 1 to 5, 8 to 12, 15, and 17) that do not satisfy the twist ratio of 1.5 to 2.5, while maintaining the tensile properties comparable to those of the cords of Comparative Examples. The reinforcing cords of Comparative Examples (Comparative Examples 6, 7, 13, 14, 16, and 18), in which the peripheral strands are not "normal lay" strands although the twist ratio of 1.5 to 2.5 is satisfied, have not only poorer tensile properties than the reinforcing cords of Examples but also insufficient bending fatigue resistance. That is, it was confirmed that the reinforcing cords of Examples have longer bend lives than the reinforcing cords of Comparative Examples while maintaining their good tensile properties such as tensile strength.

It is believed from the above results that by limiting the peripheral strands to "normal lay" strands and limiting the twist ratio to the range of 1.5 to 2.5, the shear stress generated in the reinforcing cord at the time of bending can be suppressed and a crack can be delayed to occur in the coating film.

INDUSTRIAL APPLICABILITY

Since the reinforcing cord of the present invention achieves high bending fatigue resistance and good tensile properties, it is applicable to the reinforcement of various rubber products. For example, it can be used suitably as a cord for reinforcing a rubber product that is required to have high levels of bending fatigue resistance and tensile properties. Furthermore, since the rubber product of the present invention can withstand high load, it can be used in various applications.

The invention claimed is:

1. A reinforcing cord for rubber reinforcement comprising:
a fiber core; and
a plurality of strands disposed around the fiber core,
wherein the fiber core is formed of one or a plurality of highly elastic fibers having a tensile elastic modulus of at least 100 GPa,
each of the plurality of strands is formed of a plurality of glass fibers that are primarily twisted, and the plurality of the strands are finally twisted to be disposed around the fiber core,
a direction of the final twist of the plurality of the strands is opposite to a direction of the primary twist in each of the plurality of the strands, and
a number of the final twists of the plurality of the strands is 1.0 to 3.0 times/25 mm, and a ratio of a number of the primary twists in each of the plurality of the strands to the number of the final twists of the plurality of the strands (the number of the primary twists/the number of the final twists) is in a range of 1.5 to 2.5.

2. The reinforcing cord according to claim 1, wherein
the fiber core is made of the one highly elastic fiber, and
the number of the strands disposed around the fiber core is 8 to 15.

3. The reinforcing cord according to claim 1, wherein the one or the plurality of the highly elastic fibers in the fiber core are untwisted.

4. The reinforcing cord according to claim 1, wherein
the one or the plurality of the highly elastic fibers in the fiber core are primarily twisted, and
the number of the primary twists in the fiber core is 0.1 to 3.0 times/25 mm.

5. The reinforcing cord according to claim 1, wherein the highly elastic fiber is a carbon fiber.

6. The reinforcing cord according to claim 1, wherein the highly elastic fiber is a polyparaphenylene benzobisoxazole fiber.

7. The reinforcing cord according to claim 1, further comprising coating films provided on a surface of the fiber core and surfaces of the strands,
wherein the coating films are formed by applying a treatment liquid containing a rubber latex as its main component to the fiber core and the strands and then drying the treatment liquid.

8. The reinforcing cord according to claim 1, further comprising a rubber layer that covers a surface of the reinforcing cord.

9. A rubber product comprising: a rubber composition; and a reinforcing cord according to claim 1 embedded in the rubber composition.

10. The rubber product according to claim 9, being a toothed belt or a flat belt.

* * * * *